US010343905B2

(12) United States Patent
Wang et al.

(10) Patent No.: US 10,343,905 B2
(45) Date of Patent: Jul. 9, 2019

(54) HYDROGEN GENERATING SYSTEM

(71) Applicant: Temasek Polytechnic, Singapore (SG)

(72) Inventors: Lei Wang, Singapore (SG); Ming Han, Singapore (SG); Yunzhong Chen, Singapore (SG); Ee Ho Gareth Tang, Singapore (SG)

(73) Assignee: TEMASEK POLYTECHNIC, Singapore (SG)

( * ) Notice: Subject to any disclaimer, the term of this patent is extended or adjusted under 35 U.S.C. 154(b) by 107 days.

(21) Appl. No.: 15/032,606

(22) PCT Filed: Oct. 28, 2014

(86) PCT No.: PCT/SG2014/000505
§ 371 (c)(1),
(2) Date: Apr. 27, 2016

(87) PCT Pub. No.: WO2015/065289
PCT Pub. Date: May 7, 2015

(65) Prior Publication Data
US 2016/0272489 A1 Sep. 22, 2016

(30) Foreign Application Priority Data
Oct. 29, 2013 (SG) .............................. 201308060-1

(51) Int. Cl.
C01B 3/06 (2006.01)
B01J 7/02 (2006.01)
(Continued)

(52) U.S. Cl.
CPC .................. C01B 3/065 (2013.01); B01J 7/02 (2013.01); B01J 21/18 (2013.01); B01J 23/42 (2013.01);
(Continued)

(58) Field of Classification Search
CPC ...... Y02E 60/362; Y02E 60/324; C01B 3/065; C01B 2203/066; C01B 2203/1052;
(Continued)

(56) References Cited

U.S. PATENT DOCUMENTS 5,478,624 A * 12/1995 Lofquist ................ D02G 3/402
139/399
2004/0033194 A1* 2/2004 Amendola ............. B01J 23/462
48/61

(Continued)

FOREIGN PATENT DOCUMENTS

CN 1911784 A 2/2007
CN 101243163 A 8/2008
(Continued)

OTHER PUBLICATIONS

International Preliminary Report on Patentability for International Application No. PCT/SG2014/000505, Report dated Feb. 5, 2016, dated Feb. 5, 2016, 20 Pgs.

(Continued)

Primary Examiner — Amber R Orlando
Assistant Examiner — Syed T Iqbal
(74) Attorney, Agent, or Firm — Konrad Raynes Davda & Victor LLP; William P. Wilbar, IV

(57) ABSTRACT

The present invention relates to a solid fuel, a system and a method for generating hydrogen. The solid fuel comprises sodium borohydride, catalyst loaded fibers and a binder, wherein the catalyst loaded fibers and the binder form a scaffold structure within which the sodium borohydride is positioned. The system comprises a fuel cartridge containing the solid fuel of the present invention for generating hydrogen gas, a reactor configured to house the fuel cartridge, a tank for storing water, a pump and a liquid conduit for conveying water from the tank to the fuel cartridge housed (Continued)

within the reactor to induce a hydrolysis reaction of the solid fuel contained in the fuel cartridge and a controller for regulating flow of the water.

9 Claims, 6 Drawing Sheets

(51) Int. Cl.
| | |
|---|---|
| *B01J 21/18* | (2006.01) |
| *B01J 23/42* | (2006.01) |
| *B01J 31/06* | (2006.01) |
| *C01B 3/00* | (2006.01) |
| *H01M 8/065* | (2016.01) |
| *H01M 8/1018* | (2016.01) |

(52) U.S. Cl.
CPC .............. *B01J 31/06* (2013.01); *C01B 3/0084* (2013.01); *H01M 8/065* (2013.01); *H01M 8/1018* (2013.01); *B01J 2231/005* (2013.01); *B01J 2531/005* (2013.01); *H01M 2008/1095* (2013.01); *H01M 2300/0082* (2013.01); *Y02E 60/324* (2013.01); *Y02E 60/362* (2013.01)

(58) Field of Classification Search
CPC ......... C01B 3/0084; B01J 8/00; B01J 8/0453; B01J 7/02; B01J 21/18; B01J 23/42; B01J 31/06; B01J 2231/005; B01J 2531/005; H01M 8/065; H01M 8/1018; H01M 2300/0082; H01M 2008/1095
See application file for complete search history.

(56) References Cited

U.S. PATENT DOCUMENTS

| | | | |
|---|---|---|---|
| 2005/0058595 A1 | 3/2005 | Shi et al. | |
| 2007/0178335 A1* | 8/2007 | Zimmermann | ....... F17C 11/005 |
| | | | 429/421 |
| 2008/0233462 A1 | 9/2008 | Curello et al. | |
| 2011/0076225 A1 | 3/2011 | Shah et al. | |
| 2012/0171089 A1* | 7/2012 | Chou | ..................... D04H 1/413 |
| | | | 422/631 |
| 2013/0136661 A1* | 5/2013 | Cheng | ....................... B01J 8/00 |
| | | | 422/162 |

FOREIGN PATENT DOCUMENTS

| | | |
|---|---|---|
| CN | 101863454 A | 10/2010 |
| CN | 103130181 A | 6/2013 |
| WO | 2015065289 A1 | 5/2015 |

OTHER PUBLICATIONS

International Search Report and Written Opinion for International Application No. PCT/SG2014/000505, Search completed Dec. 23, 2014, dated Dec. 23, 2014, 15 Pgs.

\* cited by examiner

HYDROGEN GENERATING SYSTEM

CROSS REFERENCE TO RELATED APPLICATIONS

This application is a U.S. national phase filing of PCT Application Serial No. PCT/SG2014/000505 filed Oct. 28, 2014 that claims priority to Singapore Patent Application Serial No. 201380601 filed Oct. 29, 2013. The content of both of these applications are hereby incorporated by reference as if set forth herewith.

FIELD OF THE INVENTION

The present invention relates to a solid fuel, a system and a method for generating hydrogen gas. More particularly, the present invention relates to a solid fuel with a scaffold structure, a system for generating hydrogen gas and a method for generating hydrogen gas.

BACKGROUND OF THE INVENTION

Comparing with the heavy and bulky stored hydrogen sources, such as, compressed hydrogen cylinder, cryogenic liquid hydrogen tank and metal hydride hydrogen storage canister, that is, hydrogen-on-demand generator that produces hydrogen onsite shows advantages as reliable hydrogen source in high hydrogen content, high portability and flexibility.

Among the different technologies used in onsite hydrogen generations, such as, reformer and electrolyser, hydrolysis of metals or chemical hydrides is more attractive, since usually there is no heavy demand on electricity input or heat input during the hydrogen generation process.

For example, hydrolysis of sodium borohydride is widely studied due to its large theoretical hydrogen content (10.8 wt %), compared with the low hydrogen content of 1.6 to 5 wt % in various stored hydrogen sources.

Sodium borohydride is a thermally stable, hygroscopic, white crystalline solid that releases hydrogen through the following hydrolysis reaction with the assistance of catalysts:

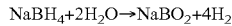

$$NaBH_4 + 2H_2O \rightarrow NaBO_2 + 4H_2$$

Various hydrogen generating systems have been developed for the production of hydrogen gas from aqueous sodium borohydride solution based on this principle. Such systems typically comprise a fuel tank for storing the sodium borohydride solution, a storage tank for storing the by-product, sodium metaborate ($NaBO_2$) solution produced by the process, a pump, a reactor and a separator. However, all of these have their significant drawbacks.

Firstly, the limited durability of the heterogeneous catalysts leads to higher cost of a hydrogen generator. Secondly, the hydrolysis by-product, sodium metaborate has a relatively small solubility in water, only 28 g in 100 g water at 25° C. It has been reported that the optimum concentration of sodium borohydride in the starting solution is about 15 wt % (the solubility of sodium borohydride in water is approximately 35 wt % at 25° C.), otherwise sodium metaborate would precipitate from the solution and thus restricting the catalyst from reacting with the reactants and clogging the reactor and tubes. As a result, hydrogen generation capacity is usually capped at 3.2 wt %, a value that is rather inadequate considering the theoretical value of 10.8 wt %.

More efforts are made by researchers on searching for methods to use high concentration sodium borohydride as a starting solution; less effort is made on using solid sodium borohydride directly for the hydrolysis reaction. Although using solid sodium borohydride directly seems more superior in hydrogen generation capacity, the main obstacle is the crystallization of the by-product, sodium metaborate, which is sticky and turns strong, thus clogging the surface of the catalyst and unreacted fuel. This in turns retard the contact of the reactants, blocking the tubes and the reactors. This interrupts continuous generation of hydrogen.

Therefore, it is desirable to design a solid sodium borohydride fuel and related hydrogen generator which can constrain the by-product sodium metaborate within certain region and thus ensure a smooth and continuous operation, as well as a uniform reaction in the whole space of the reactor. The hydrogen generation capacity should be significantly enhanced, compared with the system using aqueous sodium borohydride fuel.

Consequently, there is a need to provide an alternative fuel, system and method for generating hydrogen that seeks to address at least some of the problems described hereinabove, or at least to provide an alternative.

SUMMARY OF THE INVENTION

In accordance with a first aspect of the invention, a solid fuel for generating hydrogen is provided. The solid fuel comprises sodium borohydride, catalyst loaded fibres and a binder, wherein the catalyst loaded fibres and the binder form a scaffold structure within which the sodium borohydride is positioned.

In accordance with an embodiment of the invention, the catalyst loaded fibres comprises carbon fibres, glass fibres, ceramic fibres or any combinations thereof.

In accordance with a second aspect of the invention, a process for producing a solid fuel for the generation of hydrogen is provided. The process comprises pre-mixing a catalyst with fibres to obtain a catalyst loaded fibres, mixing the catalyst loaded fibres with sodium borohydride to obtain a first mixture, grinding the first mixture, adding a binder to the first mixture to obtain a second mixture, subjecting the second mixture to heat, and cooling the heated mixture to obtain a solid fuel with a scaffold structure.

In accordance with an embodiment of the invention, the catalyst is pre-mixed with fibres by soaking the fibres in a solution containing the catalyst. The solution containing the fibres is then refluxed for a predetermined period before the fibres is separated from the solution. The fibres are dried to obtain the catalyst loaded fibres.

In accordance with a third aspect of the invention, a hydrogen generating system is provided. The system comprises a fuel cartridge containing a solid fuel for generating hydrogen gas, a reactor configured to house the fuel cartridge, a tank for storing water, a pump and a liquid conduit for conveying water from the tank to the fuel cartridge housed within the reactor to induce a hydrolysis reaction of the solid fuel contained in the fuel cartridge, and a controller for regulating flow of the water, and wherein the solid fuel comprises sodium borohydride, catalyst loaded fibres and a binder, the catalyst loaded fibres and the binder form a scaffold structure within which the sodium borohydride is positioned.

In accordance with an embodiment of the invention, the reactor having a chamber for collecting and buffering the hydrogen gas generated from the fuel cartridge before the hydrogen gas is released from the reactor.

In accordance with an embodiment of the invention, the reactor comprises a tank for receiving the fuel cartridge, the tank having an open end and a closed end, a lid for fastening to the open end of the tank and a barbed fitting located in the centre of the lid.

In accordance with an embodiment of the invention, the fuel cartridge comprises a main body for containing the solid fuel, a first cap disposed at one end of the main body and a second cap disposed at opposite end of the main body, a water distributor having a plurality of holes and disposed within the main body; and a connector for connecting the water distributor to the first cap disposed at the one end of the main body.

In accordance with an embodiment of the invention, the fuel cartridge comprises a hydrophobic semipermeable material wrapped around the peripheral surface of the fuel cartridge, wherein the semipermeable material is configured to allow hydrogen gas to pass through the material while preventing water or solid materials from passing through the material. In accordance with another embodiment of the invention, the main body of the fuel cartridge is made of hydrophobic material having a plurality of micro-pores.

In accordance with an embodiment of the invention, the barbed fitting of the reactor engages with the connector of the fuel cartridge and the water distributor to form a complete water flow channel when the lid of the reactor is fastened to the open end of the tank.

In accordance with a fourth aspect of the invention, a hydrogen fuel cartridge is provided. The hydrogen fuel cartridge comprises a main body for containing a solid fuel for generating hydrogen, a first cap disposed at one end of the main body and a second cap disposed at opposite end of the main body, a water distributor having a plurality of holes and disposed within the main body, a connector for connecting the water distributor to the first cap disposed at the one end of the main body, and wherein the solid fuel comprises sodium borohydride, catalyst loaded fibres and a binder, the catalyst loaded fibres and the binder form a scaffold structure within which the sodium borohydride is positioned.

In accordance with an embodiment of the invention, the water distributor is coupled to the connector located in the centre of the first cap.

In accordance with a fifth aspect of the invention, a method of generating hydrogen is provided. The method comprises loading a fuel cartridge containing a solid fuel into a hydrogen generator, providing water to a water tank housed within the hydrogen generator, conveying water from the water tank to a water distributor disposed within the fuel cartridge whereupon the water is dispensed through a plurality of holes provided on the water distributor to react with the solid fuel to generate hydrogen gas, collecting the hydrogen gas within the reactor before releasing it for use, and wherein the solid fuel comprises sodium borohydride, catalyst loaded fibres and a binder, the catalyst loaded fibres and the binder form a scaffold structure within which the sodium borohydride is positioned.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
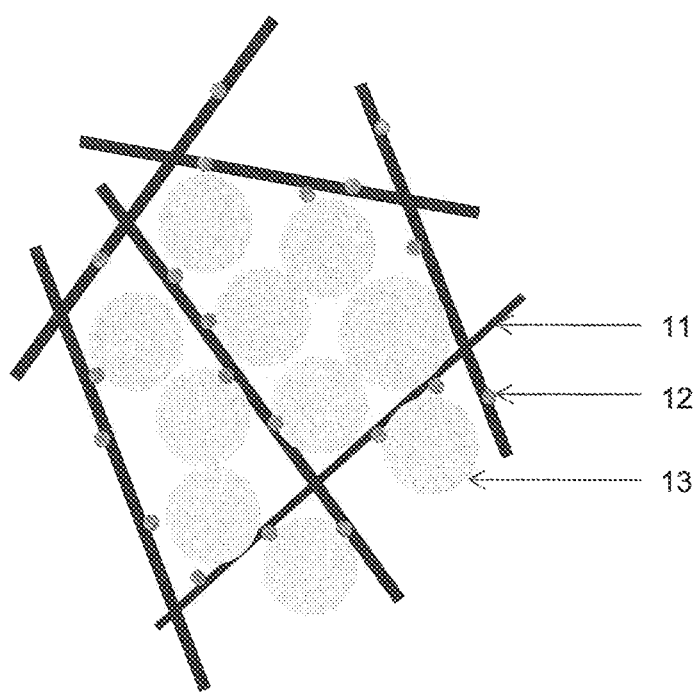
FIG. 1 is a schematic drawing of the solid fuel with scaffold structure in accordance with an embodiment of the invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

The present invention provides a solid fuel for generating hydrogen. The solid fuel comprises sodium borohydride, catalyst loaded fibres and a binder. The essential feature of the solid fuel is the sodium borohydride particles which are disposed within a scaffold structure formed by the catalyst loaded fibres and the binder.

The term "catalyst loaded fibres" as used herein means fibres which are pre-loaded with catalyst. Suitable fibres that can be used include, but are not limited to, carbon fibres, glass fibres, ceramic fibres or any combinations thereof. In the preferred embodiment of the invention, carbon fibres are used. Examples of catalyst that may be used include, but are not limited to, a salt selected from the group consisting of cobalt (II) chloride, nickel chloride or precious metals selected from the groups consisting of platinum, iridium and ruthenium. In the present invention, the fibres are pre-loaded with catalyst to ensure a quick reaction process.

The catalyst loaded fibres can be prepared by any suitable methods known in the art. In an exemplary embodiment of the invention, the catalyst loaded fibres are prepared by soaking fibres in related salt solution, such as cobalt (II) chloride ($CoCl_2$), chloroplatinic acid ($H_2PtCl_6$) or chloroiridic acid ($H_2IrCl_6$). The fibres may be soaked in the solution for 1 to 3 hours before the fibres are taken out to dry. Other methods such as implanting, sputtering, etc. can be employed to prepare the catalyst loaded fibres without departing from the scope of the invention. In an embodiment of the invention, the catalyst is loaded in an amount ranging from 1 to 3 wt % of the fibres.

In a preferred embodiment, each of the fibres has a diameter from 1 to 20 microns. The length of each fibres ranges from 20 to 200 microns.

In an embodiment of the invention, the solid fuel of the present invention is prepared by mixing the sodium borohydride powder with the catalyst loaded fibres. The mixture is grinded before a binder is added. The mixture may further be grinded before it is heated for a predetermined period. After which, the mixture is cooled to allow the mixture to solidify into a solid piece. The solid fuel may then be further grinded into small particles with a size in the range of 20 to 2,000 micrometer (μm), preferably in the range of 100 to 500 micrometer. The solid fuel is then stored in a dry environment, which may be in a dry box or a closed container, ready to be filled into a fuel cartridge.

Examples of binder that may be used include, but are not limited to, copolyamide (Co-PA) powder, polyester resins, poly(vinyl acetate), polyacrylates, polymethacrylates, polycarbonates, polyvinylacetoacetal, polyvinylpropional, polyvinylbutyral, phenoxy resins, epoxy resins, urethane resins, cellulose esters, cellulose ethers, etc. In a preferred embodiment, the binder is copolyamide powder. Preferably, the binder is present in the solid fuel in an amount from 1 to 10 wt % based on the total weight of the solid fuel.

In the present invention, the catalyst loaded fibres and the binder form a scaffold structure. This allows the sodium borohydride to be constrained within the scaffold structure when sodium borohydride is added to the mixture.

FIG. 1 shows a schematic drawing of the solid fuel with the scaffold structure in accordance with an embodiment of the invention. Fibres 11 which are loaded with the catalyst 12 establish a scaffold structure with the assistance of the binder (not shown). The binder with thermoplastic property, that becomes pliable or moldable above a specific temperature and returns to a solid state upon cooling, is used to bind the fibres and thus form the scaffold structure through heat treatment.

Sodium borohydride particles 13 are loosely loaded in the scaffold structure. The scaffold structure is essential in constraining and immobilizing the sodium borohydride within the scaffold structure, including the by-product, sodium metaborate which is produced during the hydrolysis reaction.

Figure 2:
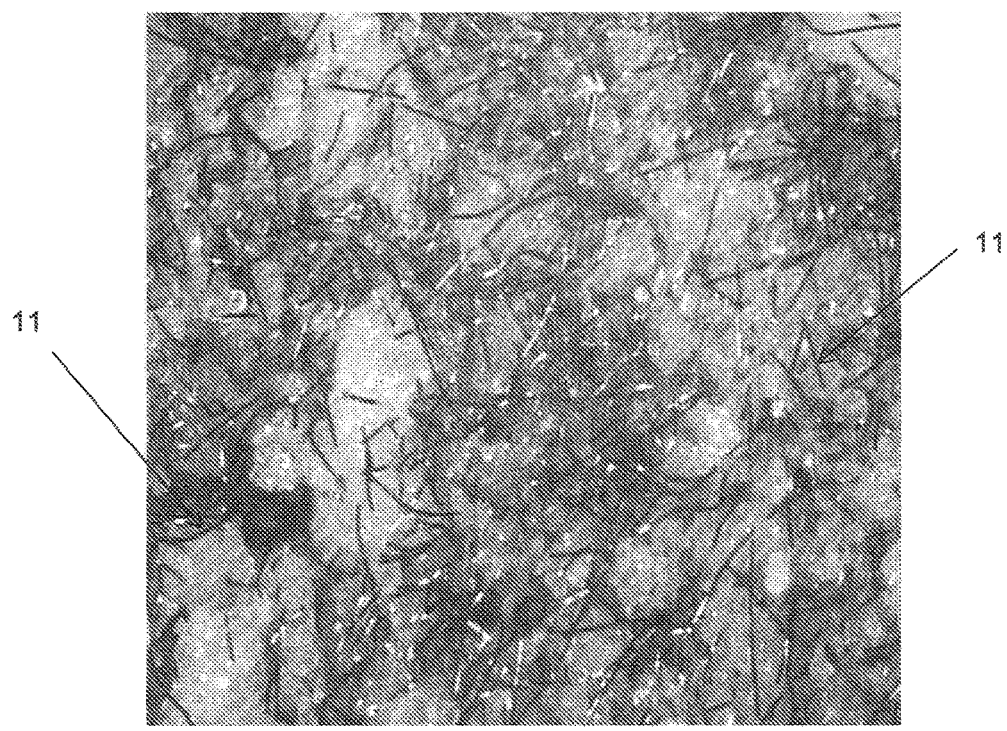
FIG. 2 is an image showing the microstructure of the solid fuel in accordance with an embodiment of the invention.

FIG. 2 is an image showing the microstructure of the solid fuel of the present invention. The sodium borohydride particles 13 are loosely loaded within the scaffold structure formed by the catalyst loaded fibres 11 and the binder. The binder is not visible in FIG. 2 as it has melted and distributed into the whole structure when the solid fuel is prepared.

The solid fuel of the present invention can be used as a continuous and reliable hydrogen source. An uninterrupted hydrolysis reaction for hydrogen generation can be achieved since the sodium borohydride and especially the hydrolysis by-product, sodium metaborate, is constrained and immobilized within the scaffold structure of the solid fuel. As a result, problems induced by sodium metaborate crystallization, such as blockage of the hydrogen flow channels and cladding of the catalyst and/or unreacted fuel can be avoided. Continuous and stable supply of hydrogen can be achieved as long as the liquid reagent, i.e. water, the catalyst and the unreacted sodium borohydride can contact each other without any obstruction.

Besides their function in the scaffold structure formation, the fibres also play an important role as a catalyst carrier, which substantially enhance the contact area between the catalyst and the sodium borohydride. This enhances catalysis efficiency and also reduces catalyst cost since lower catalyst loading level can be employed without affecting the speed of the hydrolysis reaction.

Figure 3A:
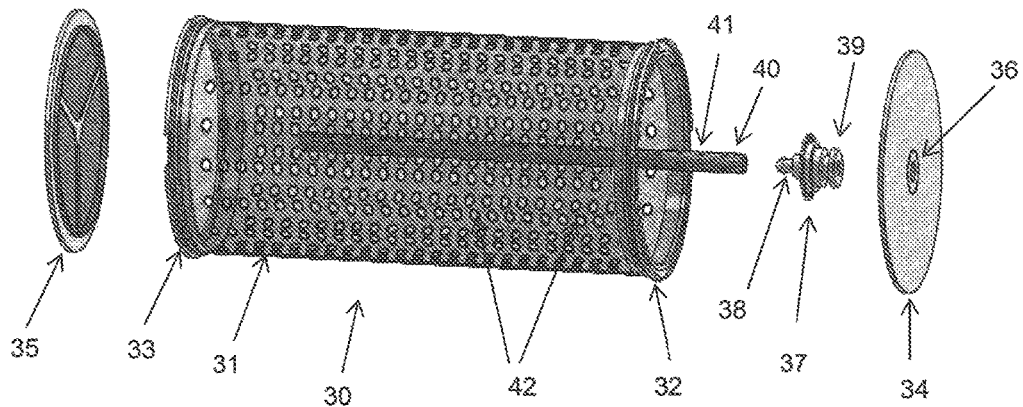
FIG. 3A is a side view of a fuel cartridge in accordance with one embodiment of the invention.

FIG. 3A shows an exemplary embodiment of a fuel cartridge for storing the solid fuel of the present invention. The fuel cartridge 30 comprises a main body 31, a first end and an opposite end. In one embodiment of the invention, the first end and the opposite end of the fuel cartridge are open-ended. Each end has a rim 32, 33 for engaging with a cap 34, 35. Each of the caps 34, 35 can be detachably coupled to each rim 32, 33 by any suitable means. In one embodiment, each cap 34, 35 is threadedly fastened to each rim 32, 33. In another embodiment of the invention, only one end of the fuel cartridge 30 is open-ended for engaging with a cap while the opposite end is closed-ended.

As shown in FIG. 3A, cap 34 includes an aperture 36 provided substantially in the centre of the cap for locating a barb connector 37. The barb connector 37 comprises a nozzle 38 on one side and a port 39 on opposite side.

The fuel cartridge 30 is provided with a plurality of through holes 42 around the main body 31 to allow hydrogen gas to pass through. The through holes 42 may be arranged in any manner. In one exemplary embodiment, the through holes 42 are arranged in an aligned grid. In other embodiments, the through holes 42 may be arranged in a random manner. All the through holes 42 may be of the same size or they may be of different sizes. Preferably, each through holes 42 has a diameter in the range from 0.05 mm to 2 mm.

The main body 31 of the fuel cartridge 30 can be made from any type of materials that is able to withstand a temperature of up to 200° C. This is because the hydrolysis reaction that takes place within the main body 31 of the fuel cartridge 30 is an exothermal reaction. Suitable materials include, but are not limited to, a thin layer of metal, polymer or a composite. Preferably, the main body 31 of the fuel cartridge 30 is made of aluminium or stainless steel foil, and more preferably, with a thickness of 0.1 to 2 mm. In an embodiment of the invention, the main body 31 of the fuel cartridge 30 is cylindrical in shape but the shape is not limited as such. Any suitable shape known in art can be employed without departing from the scope of the invention, such as elliptical, rectangular prism, etc.

The fuel cartridge 30 further includes a water distributor 40. The water distributor 40 is disposed within the main body 31 of the fuel cartridge 30 and through the longitudinal length of the main body 31. The water distributor 40 has a first distal end and a second distal end. The first distal end is configured to be detachably, fitted to the nozzle 38 of the barb connector 37. In one embodiment of the invention, the second distal end is closed-ended and it is disposed proximate the opposite end of the fuel cartridge 30. In another embodiment, the second distal end is open-ended.

In this embodiment, the water distributor 40 should have a length sufficiently the same as the main body 31 of the fuel cartridge 30 such that when the water distributor 40 is assembled within the fuel cartridge 30, the cap 35 is able to cover the open-end of the second distal end of the water distributor 40 in a reasonably tight manner. In yet another embodiment of the invention, the second distal end of the water distributor 40 forms an integral part with the cap 35. This means that the water distributor 40 extends from the cap 35 forming an integral unit.

The water distributor 40 is provided with a plurality of holes 41 spaced along the longitudinal surface of the water distributor for dispensing water within the main body 31 of the fuel cartridge 30. The holes 41 may be arranged in any manner. In one exemplary embodiment, the holes 41 are arranged in an aligned grid. In other embodiments, the holes 41 may be arranged in a random manner. The holes 41 may be of the same size or they may be of different sizes. Preferably, each holes 41 has a diameter in the range from 50 µm to 500 µm, preferably around 100 µm. In one embodiment of the invention, the water distributor 40 is a hollow tube. Other configurations may be used without departing from the scope of the invention.

The water distributor 40 can be made from the same material as the fuel cartridge 30 or it can be made from any type of materials that is able to withstand a temperature of up to 200° C. Suitable materials include, but are not limited to, a thin layer of metal, polymer or a composite. Preferably, the water distributor is made of aluminium or stainless steel foil.

Figure 3B:
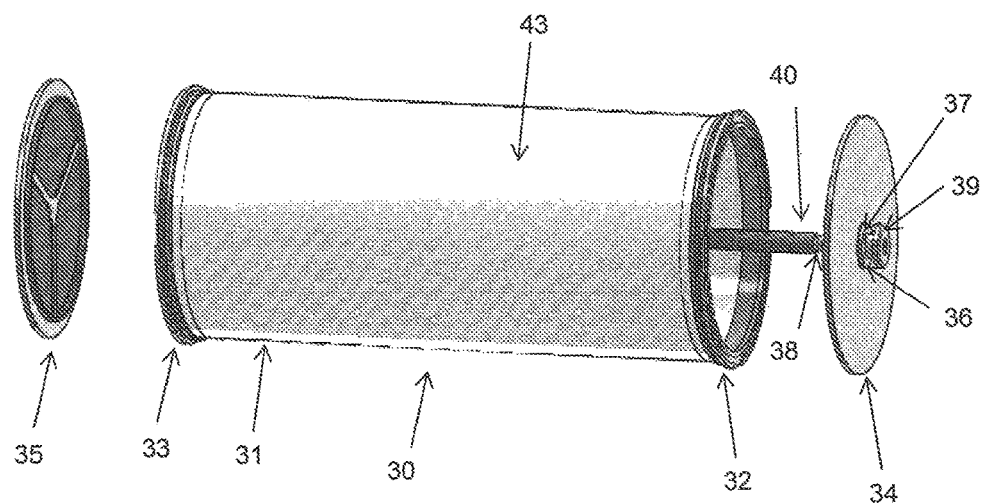
FIG. 3B is a side view of a complete fuel cartridge wrapped with a semipermeable material.

Referring now to FIG. 3B, a side view of the fuel cartridge 30 ready for fuel filling is shown. The barb connector 37 is located into the aperture 36 of the cap 34. The water distributor 40 is detachably fitted to the nozzle 38 of the barb connector 37 and the cap 34 is fastened to the rim 32 of the fuel cartridge 30. The solid fuel with the scaffold structure can be filled into the main body 31 of the fuel cartridge 30 through the opening side near rim 32 or the side near rim 33. Once the solid fuel is filled into the fuel cartridge 30, the cap is fastened to the rim.

In an embodiment of the invention, the fuel cartridge 30 is further provided with a semipermeable material 43 that wraps the peripheral surface of the main body 31 of the fuel cartridge 30. The semipermeable material 43 should be porous with hydrophobic properties such that it allows hydrogen gas to pass through but not water, vapour or solid materials. When the fuel cartridge 30 is in used, water is delivered to the port 39, through the nozzle 38 and into the water distributor 40. As the water travels through the longitudinal body of the water distributor 40, it sprays out from the plurality of holes 41 into the main body 31 of the fuel cartridge 30. A mist is formed around the water distributor 40 and hydrogen gas is generated within the main body 31 of the fuel cartridge 30. The hydrogen gas generated within the main body 31 of the fuel cartridge 30 passes through the plurality of through holes 42 (shown in FIG. 3A) and the semipermeable material 43 to be collected, while the water which is dispensed from the water distributor 40 into the fuel cartridge and/or the vapour produced during the reaction are constrained within the main body 31 of the fuel cartridge 30 for continuous reaction to take place. Any suitable semipermeable material which exhibits such semi-permeability may be used without departing from the scope of the invention. In one embodiment of the invention, the semipermeable material is a gas permeable membrane. Preferably, the semipermeable material is a kind of Teflon membrane, more preferably, the semipermeable material is a polytetrafluoroethylene (PTFE) membrane. In another embodiment, the wall of the main body 31 itself is fabricated as semipermeable. In other words, the wall is made of hydrophobic material and with micro pores on it. For instance, the wall can be formed by 3D printing onto hydrophobic material. In this embodiment, through holes 42 and/or the semipermeable material 43 may be omitted.

The fuel cartridge which is filled with the solid fuel can be stored in a dry box or sealed in a moisture proof bag or a container before use. The fuel cartridge is disposable and can be installed into a hydrogen generator onsite when hydrogen supply is demanded.

Figure 5:
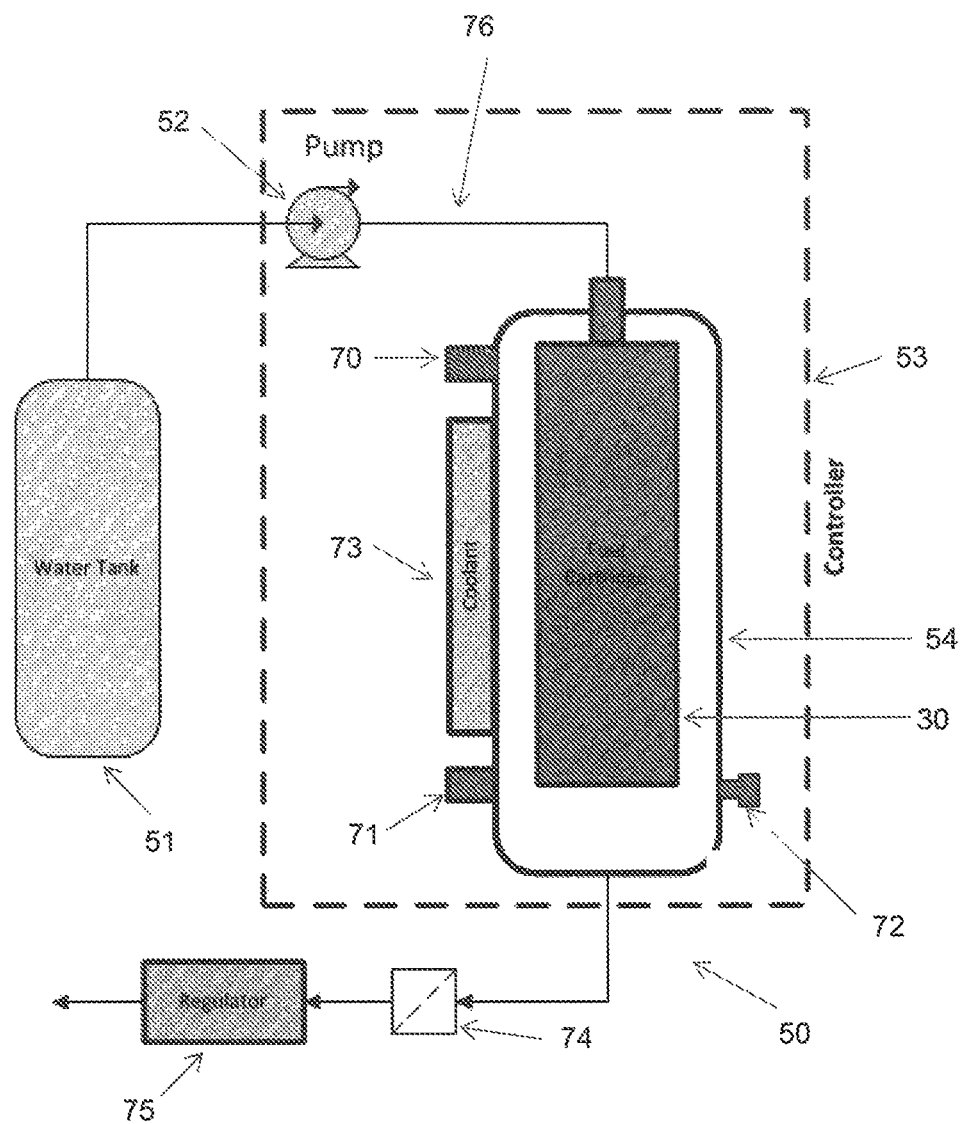
FIG. 5 is a schematic diagram of the hydrogen generator with an electronic controller in accordance with an embodiment of the invention.

In another aspect of the invention, a system for generating hydrogen is provided. An exemplary embodiment of the system of the present invention is shown in FIG. 5. The system is a hydrogen generator 50 and generally comprises a water tank 51 for storing water, a pump 52 for delivering water from the water tank 51, a controller 53 and a reactor 54. The reactor 54 is the crucial part of the system where the fuel cartridge 30 is installed therein and where hydrolysis reaction takes place.

Figure 4A:
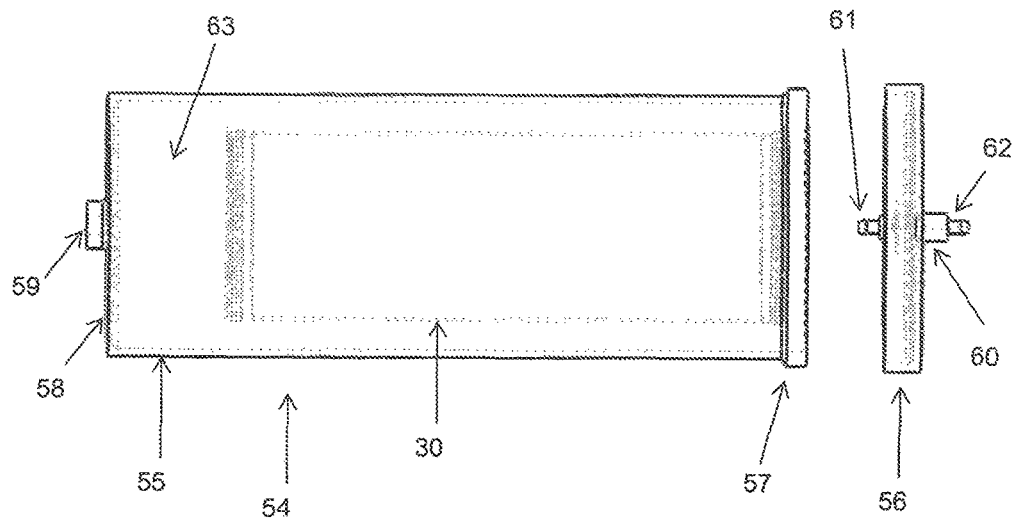
FIG. 4A is a side view of the reactor in an open configuration in accordance with an embodiment of the invention.
Figure 4B:
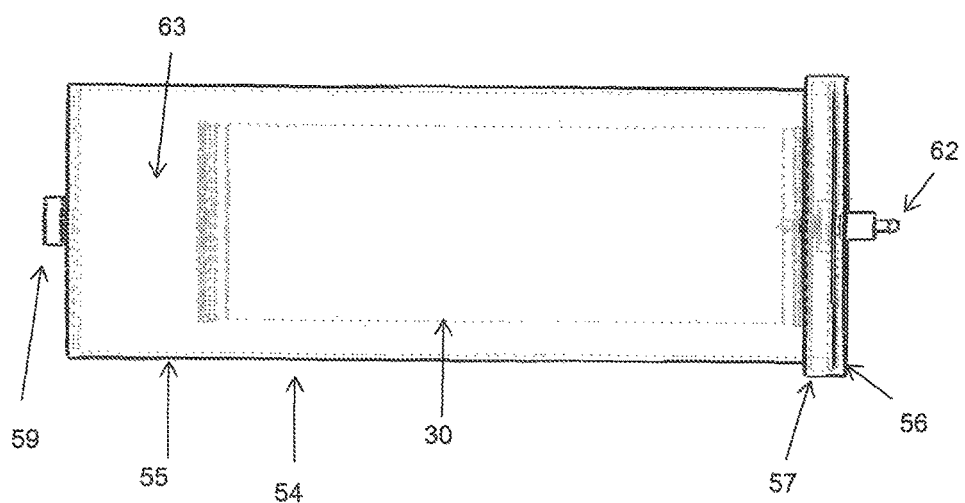
FIG. 4B is a side view of the reactor in a closed configuration in accordance with an embodiment of the invention.

FIG. 4A shows a schematic side view of the reactor 54 of the present invention in an opened configuration and FIG. 4B shows a schematic side view of the reactor 54 in a closed configuration.

Referring to FIG. 4A, reactor 54 comprises a hollow tank 55 and a lid 56. The tank 55 has an open end with rim 57 and a closed end 58. An outlet 59 is provided substantially in the centre of the closed end 58 for hydrogen conduction.

A barbed fitting 60 consisting of a nozzle 61 and a port 62 is disposed substantially at the centre of the lid 56. After the fuel cartridge 30 is inserted into the hollow tank 55, the lid 56 is fastened to the rim 57 of the tank 55 while the nozzle 61 coupled with the port 39 (shown in FIG. 3A and FIG. 3B) of the fuel cartridge 30. The barbed fitting 60, the barb connector 37 of the fuel cartridge and the water distributor 40 form a continuous duct for water delivery.

In one embodiment of the invention, the reactor 54 has a length that is substantially the same as the length of the fuel cartridge 30. The reactor 54 has a diameter larger than the fuel cartridge 30 to provide sufficient space within the reactor 54 to allow sufficient pressure to build up within the reactor 54 during the hydrolysis reaction before the hydrogen gas is released from the reactor 54 through the outlet 59. The diameters of the reactor 54 and the outlet 59, as well as the ratio of the diameters of the reactor 54 and the fuel cartridge 30, can be designed to align with the hydrogen production capacity.

In another embodiment of the invention, the reactor 54 has a length that is longer than the fuel cartridge 30 such that when the fuel cartridge 30 is inserted into the reactor 54, there is a space defining a chamber 63. The hydrogen gas produces during the hydrolysis reaction can be collected and buffered into the chamber 63 before the gas is released through the outlet 59. The chamber 63 functions as a hydrogen gas collector before the hydrogen gas is released through the outlet 59 for use. The chamber 63 also functions as a buffer tank, which collects and accumulates the hydrogen gas generated and hence, maintaining a certain pressure within the reactor 54 so as to stabilize the hydrogen supply.

The reactor 54 can be of the same shape as the fuel cartridge 30 or of different shape. The reactor 54 can be made of the same material as the fuel cartridge 30 or of different material as the fuel cartridge 30. Suitable materials include, but are not limited to, aluminium, stainless steel, polycarbonate, polyvinyl chloride, etc.

Referring to FIG. 5 again, the system of the present invention may further comprise other supplementary parts, such as a pressure sensor 70, a temperature sensor 71 and a safety valve 72. In addition, the system may also contain a coolant 73 attached to the side wall of the reactor 54, as well as a filter 74 and a pressure regulator 75 to regulate the flow of the hydrogen gas. The filter 74 constrains and removes the water vapour content from the hydrogen stream.

In an embodiment of the invention, the pressure sensor 70 and the temperature sensor 71 are connected to the reactor 54 to collect data. The data collected may then be transmitted to the controller 53 for controlling the pump 52, the coolant 73 and the regulator 75 in order to ensure a stable generation of the hydrogen gas. The safety valve 72 is provided as a standby to release the pressure in the reactor 54 when a need arises. In one embodiment of the invention, the system of the present invention is portable.

In an exemplary embodiment of the system of the invention, water from the water tank 51 is delivered into the water distributor 40 through a liquid conduit 76 by the pump 52. The water passes through the port 62, through the nozzle 38 and into the water distributor 40. The water travels through the water distributor 40 while spraying out from the plurality of holes 41. Under appropriate pressure, mist is formed around the water distributor 40. Hydrolysis reaction takes place in the fuel cartridge 30 almost instantaneously once the mist is in contact with the solid fuel contained within the fuel cartridge 30. Hydrogen gas produced during the hydrolysis reaction then passes through the plurality of through holes 42 of the fuel cartridge 30, through the semipermeable material 43 that is wrapped around the peripheral surface of the fuel cartridge 30 and into the reactor 54. The hydrogen gas generated accumulates in the reactor 54 before the gas is released through the outlet 59 for application. In the present invention, the water dispensed from the water distributor 40 and/or the vapour produced by the hydrolysis reaction is constrained within the fuel cartridge 30 by the hydrophobic semipermeable material 43. This allows continuous reaction to take place within the fuel cartridge 30, thus increases the efficiency of the reaction process. In the embodiment which has the chamber 63, pressure is built up inside the chamber 63 before the hydrogen gas is released for application through the outlet 59. The electronic controller 53 is used to control the amount of water supplied to the water distributor 40 to control the amount of hydrogen gas produces by the system.

In a further aspect of the invention, a method for generating hydrogen is provided. The method comprises loading a fuel cartridge 30 containing a solid fuel in a hydrogen generator 50, providing water to a water tank 51 housed within the hydrogen generator 50, conveying water from the water tank 51 through a liquid conduit 76 to a water distributor 40 disposed within the fuel cartridge 30 whereupon the water is dispensed through a plurality of holes 41 provided on the water distributor 40 to reach with the solid fuel to generate hydrogen gas. The hydrogen gas produced therefrom is collected within the reactor 54 before the gas is released for use.

In practice, the reactor 54 can be integrated with a fuel cell system, preferably, but not limited to, Proton Exchange Membrane (PEM) fuel cell system commonly known in the art, to form a power generating system, wherein the hydrogen gas generated by the reactor 54 can be introduced into the said fuel cell system. A contemporary PEM fuel cell system generally comprises a plurality of PEM fuel cell units connected in series. Each fuel cell unit comprises an anode side, a proton exchange membrane and a cathode side. The hydrogen molecules released from the reactor 54 flow into the anode side of the fuel cell unit and are then split into hydrogen protons and electrons. The hydrogen protons pass through the proton exchange membrane and into the cathode side of the fuel cell unit where the protons combine with the oxygen atoms as well as the electrons arrived through the external electrical circuit into water. Electricity is formed through the flow of electrons in the external electrical circuit. The said power generating system can be a reliable portable or stationary power source as long as the solid fuel and the water within the reactor 54 are not exhausted.

The solid fuel, system and method of the present invention have several advantages. As described hereinabove, an uninterrupted hydrolysis reaction can be achieved in the present invention since both the sodium borohydride and the hydrolysis by-product, sodium metaborate, are constrained and immobilized in the scaffold structure of the solid fuel. The semipermeable material provided around the peripheral surface of the fuel cartridge separates the hydrogen generated by the reaction from the reactants and helps to constrain the reactants and the by-product inside the fuel cartridge. This helps to avoid the problems induced by the by-product, sodium metaborate crystallization, such as blockage of the hydrogen flow channels and cladding of the catalyst and/or the unreacted fuel. The amount of water delivered to the reactor can be controlled by the pump and the controller. As such, a quick response can be achieved in the system since hydrogen can be produced almost instantaneously once the water is in contact with the sodium borohydride and the well dispersed catalyst. The reaction process can be terminated within a short period of time once the water supply is cut off.

The system of the present invention allows hydrolysis reaction to take place efficiently in that as water is dispensed through the plurality of holes 41 along the whole length of the water distributor 40, it reacts with the solid fuel contained within the fuel cartridge almost instantaneously and this in turns allows hydrolysis reaction to take place uniformly in the whole length of the fuel cartridge. The reactor of the present invention is orientation-proof in that it can operate when placed in any position, be it in vertical, horizontal or aslant position. Constant and stable generation of hydrogen can be obtained no matter how the reactor is positioned. This feature is especially important for a portable application, such as in an automotive vehicle. The system also allows a user to control the amount of hydrogen gas produced by system by controlling the amount of water supplied to the system. The system thus has the advantage of producing hydrogen gas on demand.

The fuel cartridge of the present invention is disposable and it can be easily replaced with a new one once the hydrogen flow rate or pressure is lower than a pre-set range. The by-product, sodium metaborate produced within the fuel cartridge can be recycled for other use.

Figure 6:
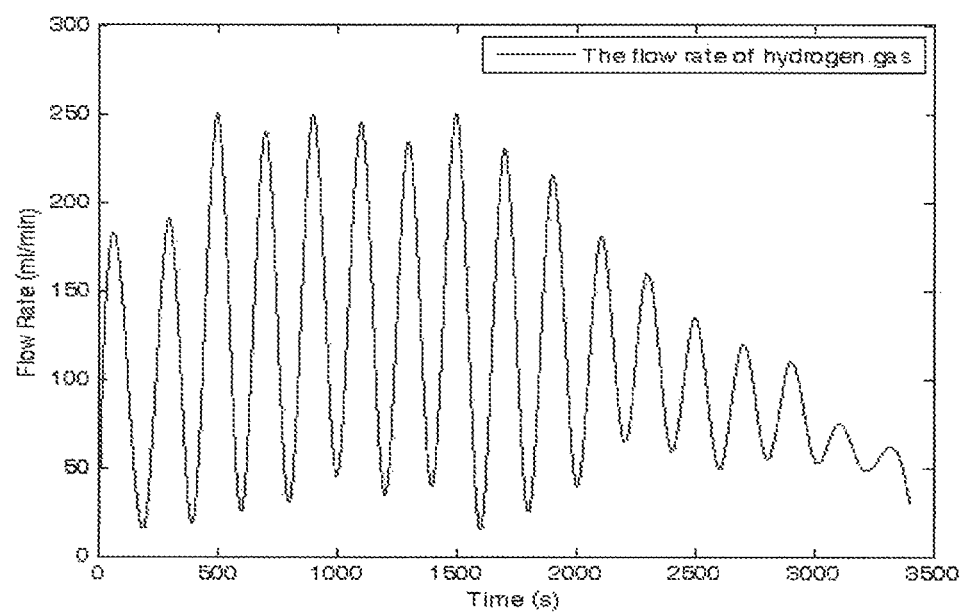
FIG. 6 is a graph showing the hydrogen gas flow rate over time in one embodiment of the invention.

FIG. 6 is a graph showing the hydrogen gas flow rate over time in accordance with one embodiment of the present invention. The test is conducted through using a reactor directly. Water is supplied intermittently through controlling on and off the pump by the controller 53. It is to be noted that there exists a good response between the hydrogen flow rate and the water supply. This shows that the system of the present invention can meet the requirements of a quick start-up and a quick shut-down of the system when required, and producing hydrogen gas on demand and in an amount desired.

Although a fluctuated hydrogen flow rate is observed when the reactor is tested directly, a stable hydrogen flow rate can be obtained from the generator due to the existence of the buffer chamber. In the embodiment shown in FIG. 6, a constant hydrogen flow rate of around 130 ml/min is achieved until 2,000 seconds lapsed. With the consumption of the fuel, the average flow rate begins to drop. The fuel cartridge can be replaced at this stage. In an embodiment of the invention, the reaction rate of the sodium borohydride is around 81 wt %.

While preferred embodiments of the invention have been illustrated and described, it will be clear that the invention is not only limited to the described embodiments. Numerous modifications, changes, variations, substitutions and equivalents will be apparent to those skilled in the art without departing from the scope of the invention as described in the claims.

Further, unless the context dearly requires otherwise, throughout the description and the claims, the words "comprise", "comprising" and the like are to be construed in an inclusive as opposed to an exclusive or exhaustive sense; that is to say, in the sense of "including, but not limited to".

The following examples are provided to further illustrate and describe particular embodiments of the present invention, and are in no way to be construed to limit the invention to the specific procedures, conditions or compositions described therein.

EXAMPLES

Example 1

Preparation of Solid Fuel of the Present Invention 100 g of sodium borohydride powder and 10 g of mashed carbon fibres loaded with catalyst were mixed and grinded before 8 g of Co-PA powder was added as a binder. The mixture was further grinded and heated up to 150° C. for 5 to 10 minutes. The mixture was then allowed to cool in a dry box. While cooling, the mixture solidified into a solid piece. After the mixture had completely cooled down, the solid piece was grinded into small particles, with sizes ranging between 30 and 50 mesh. The solid fuel obtained thereto was then stored in a dry box (or a closed container), ready to be filled into the fuel cartridge.

Example 2

Preparation of Catalyst Loaded Fibres 10 g of carbon fibres were soaked in 50 ml of 1% chloroplatinic acid ($H_2PtCl_6$) solution and refluxed for 2 hours. The fibres were taken out from the solution and rinsed in distilled water and alcohol before the fibres were dried in an oven at 140° C. for about 2 hours. The catalyst loaded fibres were then ready for fabrication of the solid fuel as described in Example 1.

The above is a description of the subject matter the inventor regards as the invention and is believed that others can and will design alternative systems that include this invention based on the above disclosure.

The invention claimed is:

1. A solid fuel for generating hydrogen, comprising:
   sodium borohydride particles, catalyst loaded fibres and a binder, wherein the sodium borohydride particles are loosely disposed within a scaffold structure formed by the catalyst loaded fibres and the binder; and
   wherein the catalyst loaded fibres are pre-loaded with catalyst selected from the group consisting of cobalt chloride, nickel chloride, chloroplatinic acid and chloroiridic acid or powder of a precious metal selected from the group consisting of platinum, iridium and ruthenium; and wherein the fibres are selected from the group consisting of carbon, glass, ceramic and combinations thereof.

2. The solid fuel according to claim 1, wherein fibres of the catalyst loaded fibres are carbon fibres.

3. The solid fuel according to claim 1, wherein fibres of the catalyst loaded fibres are glass fibres.

4. The solid fuel according to claim 1, wherein fibres of the catalyst loaded fibres are ceramic fibres.

5. The solid fuel according to claim 2, wherein the carbon fibres each having a diameter from 1 to 20 microns.

6. The solid fuel according to claim 2, wherein the carbon fibres each having a length from 20 to 200 microns.

7. The solid fuel according to claim 1, wherein the binder is selected from the group consisting of copolyamide, polyester resins, poly(vinyl acetate), polyacrylates, polymethacrylates, polycarbonates, polyvinylacetoacetal, polyvinylpropional, polyvinylbutyral, phenoxy resins, epoxy resins, urethane resins, cellulose esters and cellulose ethers.

8. The solid fuel according to claim 7, wherein the binder is copolyamide polymer.

9. The solid fuel according to claim 1, wherein the binder is present in the mixture in an amount from 1 to 10 wt % based on the total weight of the solid fuel.

* * * * *